United States Patent
Hosoya et al.

(10) Patent No.: US 12,449,998 B2
(45) Date of Patent: Oct. 21, 2025

(54) STORAGE SYSTEM AND METHOD FOR PREDICTIVE REBALANCING AND CONTROLLER NODE MANAGEMENT BASED ON LOAD PREDICTION

(71) Applicant: Hitachi, Ltd., Tokyo (JP)

(72) Inventors: Mutsumi Hosoya, Tokyo (JP); Tomohiro Yoshihara, Tokyo (JP); Yoshinori Ohira, Tokyo (JP); Norio Shimozono, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 141 days.

(21) Appl. No.: 18/469,063

(22) Filed: Sep. 18, 2023

(65) Prior Publication Data
US 2024/0361940 A1    Oct. 31, 2024

(30) Foreign Application Priority Data
Apr. 27, 2023    (JP) .................. 2023-072959

(51) Int. Cl.
*G06F 3/06* (2006.01)
(52) U.S. Cl.
CPC .......... *G06F 3/0646* (2013.01); *G06F 3/0608* (2013.01); *G06F 3/067* (2013.01)
(58) Field of Classification Search
None
See application file for complete search history.

(56) References Cited

U.S. PATENT DOCUMENTS

| | | | | |
|---|---|---|---|---|
| 6,321,238 B1* | 11/2001 | Putzolu | ................... | G06F 16/27 |
| 6,341,340 B1* | 1/2002 | Tsukerman | ............. | G06F 16/27 |
| | | | | 707/E17.007 |
| 10,884,636 B1* | 1/2021 | Abrol | ..................... | G06F 3/0631 |
| 2004/0044698 A1* | 3/2004 | Ebata | ....................... | G06F 16/10 |
| 2006/0004957 A1* | 1/2006 | Hand, III | ............ | G06F 12/0866 |
| | | | | 711/E12.019 |
| 2007/0248017 A1* | 10/2007 | Hinata | ................ | H04L 41/0893 |
| | | | | 370/252 |
| 2009/0043831 A1* | 2/2009 | Antonopoulos | ...... | G06F 3/0614 |
| 2009/0276588 A1* | 11/2009 | Murase | ................. | G06F 3/0665 |
| | | | | 711/E12.071 |

(Continued)

FOREIGN PATENT DOCUMENTS

WO    2011/092739 A1    8/2011

*Primary Examiner* — Christopher D Birkhimer
(74) *Attorney, Agent, or Firm* — Procopio, Cory, Hargreaves & Savitch LLP

(57) ABSTRACT

A storage system includes a plurality of drive nodes, a plurality of controller nodes controlling data from a host device to the plurality of drive nodes, and a processor that calculates long-term load fluctuation prediction as prediction of load fluctuation over a certain period of time in the future of the plurality of controller nodes based on time-series data of load of the plurality of controller nodes, and calculates an addition/reduction completion target time to complete addition or reduction of an operating controller node out of the plurality of controller nodes based on the long-term load fluctuation prediction and a load threshold value determined from a power performance model representing a relationship between the load and energy efficiency of the plurality of controller nodes.

10 Claims, 14 Drawing Sheets

(56) References Cited

U.S. PATENT DOCUMENTS

| | | | |
|---|---|---|---|
| 2011/0161784 A1* | 6/2011 | Selinger | G06F 11/1016 |
| | | | 714/E11.002 |
| 2011/0252214 A1 | 10/2011 | Naganuma et al. | |
| 2014/0006688 A1* | 1/2014 | Yu | G06F 12/0246 |
| | | | 365/185.03 |
| 2015/0200833 A1* | 7/2015 | Cutforth | G06F 3/067 |
| | | | 709/224 |
| 2016/0291876 A1* | 10/2016 | Alatorre | G06F 3/0685 |
| 2016/0371121 A1* | 12/2016 | Ozaki | G06F 3/0689 |
| 2017/0031727 A1* | 2/2017 | Koyanagi | G06F 9/505 |
| 2018/0314243 A1* | 11/2018 | Fujita | G05B 13/0265 |
| 2019/0140454 A1* | 5/2019 | Chase | B63H 21/17 |
| 2019/0303021 A1* | 10/2019 | Favre-Felix | G06F 3/0617 |
| 2020/0133527 A1* | 4/2020 | Zhao | G06F 3/067 |
| 2020/0389029 A1* | 12/2020 | Minegishi | H02J 3/004 |
| 2021/0080915 A1* | 3/2021 | Yan | F24F 11/46 |
| 2021/0291802 A1* | 9/2021 | Kageura | F01N 3/2013 |
| 2022/0092025 A1* | 3/2022 | Vaideeswaran | G06F 3/0619 |
| 2022/0391124 A1* | 12/2022 | Darji | G06F 3/0679 |
| 2023/0020268 A1* | 1/2023 | Pakatci | G06F 3/0634 |

\* cited by examiner

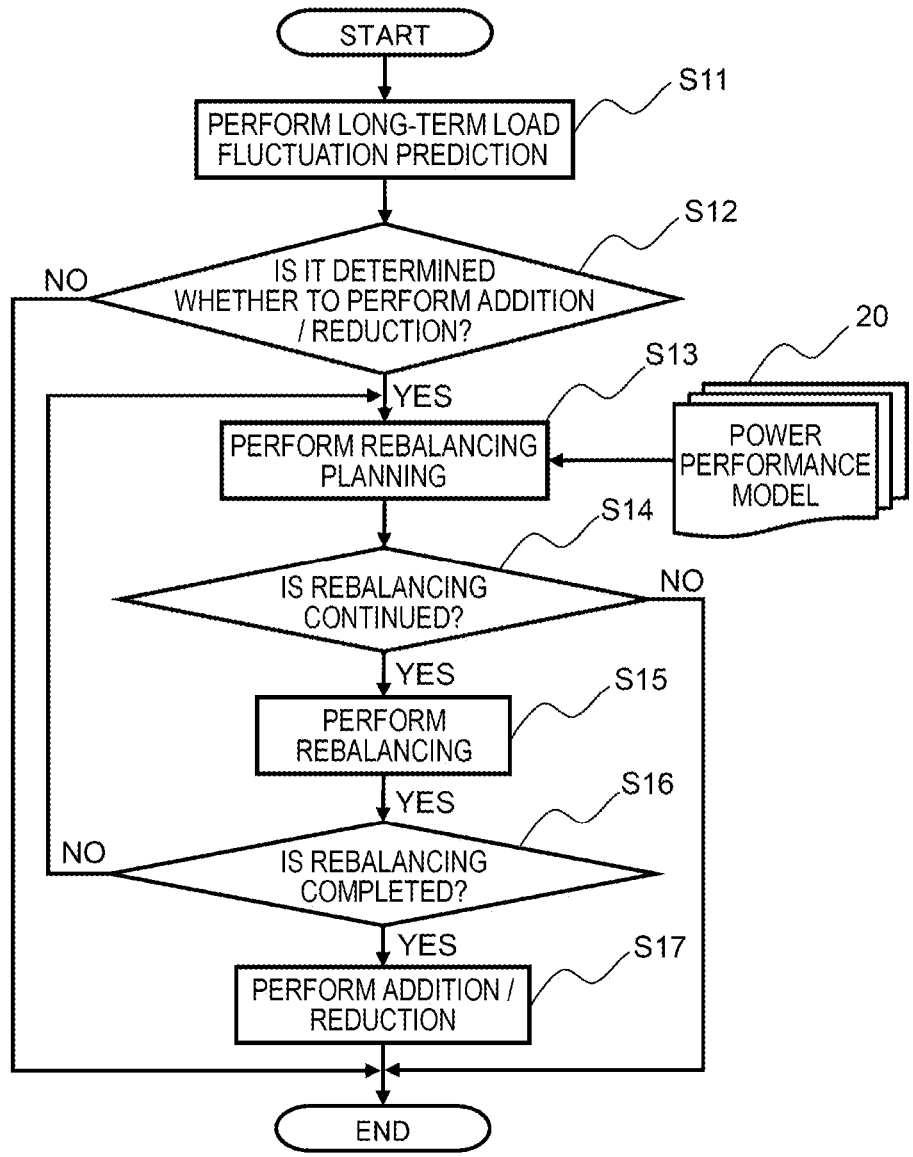

STORAGE SYSTEM AND METHOD FOR PREDICTIVE REBALANCING AND CONTROLLER NODE MANAGEMENT BASED ON LOAD PREDICTION

BACKGROUND OF THE INVENTION

1. Field of the Invention

The present invention relates to a storage system and a storage system control method.

2. Description of Related Art

With the aim of implementing a sustainable society, efforts to decarbonize are being promoted, and there is a social demand for power saving in IT infrastructure. The basis of the power saving of the IT infrastructure is to allocate necessary and sufficient resources for calculation at an appropriate timing. Since the allocation of the resources requires a certain amount of time for the preparation, it is important to allocate a right amount of resources at the appropriate timing.

Therefore, in order to know the appropriate timing of resource allocation, sometimes, predictions are made by using historical information. As the related art, for example, WO2011/092739A discloses a technique of predicting a usage capacity of data in a storage system at a future time point, calculating a difference between the predicted usage capacity and the currently allocated storage capacity, and performing addition/reduction of the storage capacity of the data storage area based on the calculation result.

A storage system includes a data storage area and a storage controller controlling the data storage area. The above-described related art discloses technique of predicting the required amount of the data storage area and setting the data storage area as a target of resource allocation based on the prediction result.

However, since the above-mentioned related art only sets the data storage area for the target of the resource allocation and does not set the storage controller for the target of the resource allocation, the appropriate amount of the resources of the storage controller cannot be allocated at the appropriate timing.

The invention has been made in consideration of the above, and an object of the invention is to appropriately allocate the resources of the storage controller.

SUMMARY OF THE INVENTION

According to one aspect, there is provided a storage system including: a plurality of drive nodes; a plurality of controller nodes controlling data I/O from a host device to the plurality of drive nodes; and a processor, wherein the processor: calculates long-term load fluctuation prediction as prediction of load fluctuation over a certain period of time in the future of the plurality of controller nodes based on time-series data of load of the plurality of controller nodes; calculates an addition/reduction completion target time to complete addition or reduction of an operating controller node out of the plurality of controller nodes based on the long-term load fluctuation prediction and a load threshold value determined from a power performance model representing a relationship between the load and energy efficiency of the plurality of controller nodes; calculates a rebalancing time for a rebalancing process based on an amount of data movement in the rebalancing process for moving data between the plurality of drive nodes in accordance with the addition or the reduction and bandwidth information of a path for the data movement; calculates a start time of the rebalancing process from the addition/reduction completion target time and the rebalancing time; and starts the rebalancing process at the start time.

According to the invention, power saving can be implemented by appropriately allocating resources of a storage controller.

BRIEF DESCRIPTION OF THE DRAWINGS

FIG. 5 is a flowchart illustrating a rebalancing and addition/reduction process according to the first embodiment;

DESCRIPTION OF EMBODIMENTS

Figure 1:
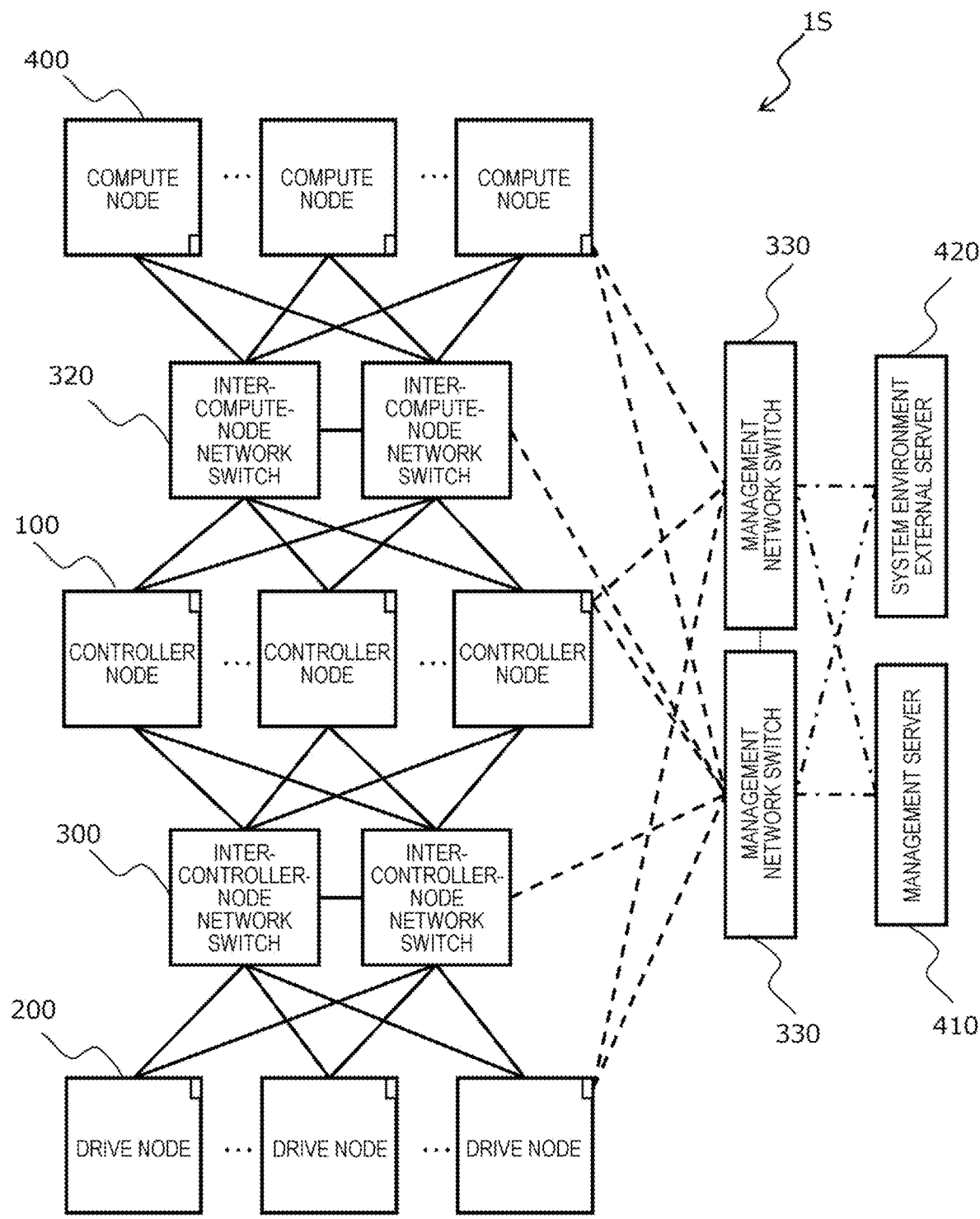
FIG. 1 is a diagram illustrating a configuration of a storage system according to a first embodiment.

Hereinafter, embodiments of the invention will be described in detail based on the drawings. In this embodiment, in principle, the same components are denoted by the same reference numerals, and repeated descriptions are omitted. It is noted that this embodiment is merely an example for implementing the invention and does not limit the technical scope of the invention.

In the following description, in some cases, processes performed by programs may be described. A computer uses a processor (for example, a central processing unit (CPU) or a graphics processing unit (GPU)) to perform the processes determined by the programs while using a memory or the like of a main storage device. For this reason, a main body of the processes performed by executing the program may be the processor. A functional unit that performs the processes is implemented by the processor executing the programs.

Similarly, the main body of the processes performed by executing the program may be a controller, device, system, computer, or node having the processor. The main body of the processes performed by executing the program may be an arithmetic unit and may include a dedicated circuit for performing specific processes. The dedicated circuit is, for example, a field programmable gate array (FPGA) or an application specific integrated circuit (ASIC).

In the following description, the program may be installed on the computer from a program source. The program source may be, for example, a program distribution server or a computer-readable non-transitory storage medium. When the program source is a program distribution server, the program distribution server includes a processor and storage resources (storage) for storing a distribution target program, and the processor of the program distribution server may distribute the distribution target program to other computers. In addition, in the embodiment, two or more programs may be implemented as one program, and one program may be implemented as two or more programs.

First Embodiment

Configuration of Storage System 1S According to First Embodiment

FIG. 1 is a diagram illustrating a configuration of a storage system 1S according to a first embodiment. The storage system 1S is a separate storage system in which a storage controller (controller node) and drive nodes are separated.

The storage system 1S includes a plurality of compute nodes 400, a plurality of controller nodes 100, and a plurality of drive nodes 200. In the storage system 1S, these are connected via an inter-controller-node network switch 300 and an inter-compute-node network switch 320.

An access request issued from a work program executed on the compute node 400 is processed for data in the drive node 200 under the control of the controller node 100. For system management, a management server 410 and a system environment external server 420 are connected via a management network switch 330. All nodes and paths are redundant to ensure system availability, but some nodes and paths are omitted from the drawing.

Configuration of Controller Node 100 According to First Embodiment

Figure 2:
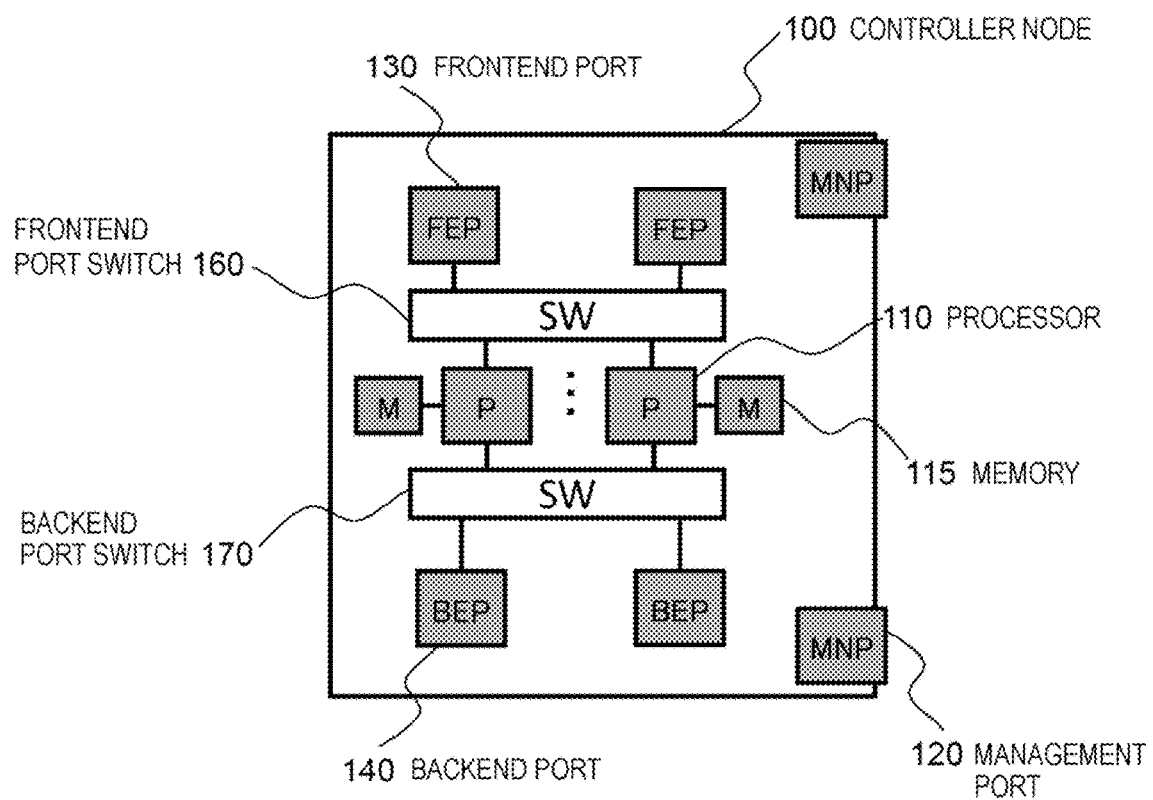
FIG. 2 is a diagram illustrating a configuration of a controller node according to the first embodiment.

FIG. 2 is a diagram illustrating a configuration of the controller node 100 according to the first embodiment.

The controller node 100 has a processor 110, a memory 115, a management port 120, a frontend port 130 and a backend port 140. The controller node 100 provides functions such as a data input/output process or data encryption/data compression/snapshot creation/data virtualization according to an instruction from the compute node 400. The controller node 100 is connected to the compute node 400 via the frontend port 130, connected to the drive node 200 via the backend port 140, and connected to the management server 410 via the management port 120.

The processor 110 inputs and outputs data via a frontend port switch 160 and the frontend port 130. The processor 110 also inputs and outputs data via a backend port switch 170 and the backend port 140.

Configuration of Management Server 410 According to First Embodiment

Figure 3:
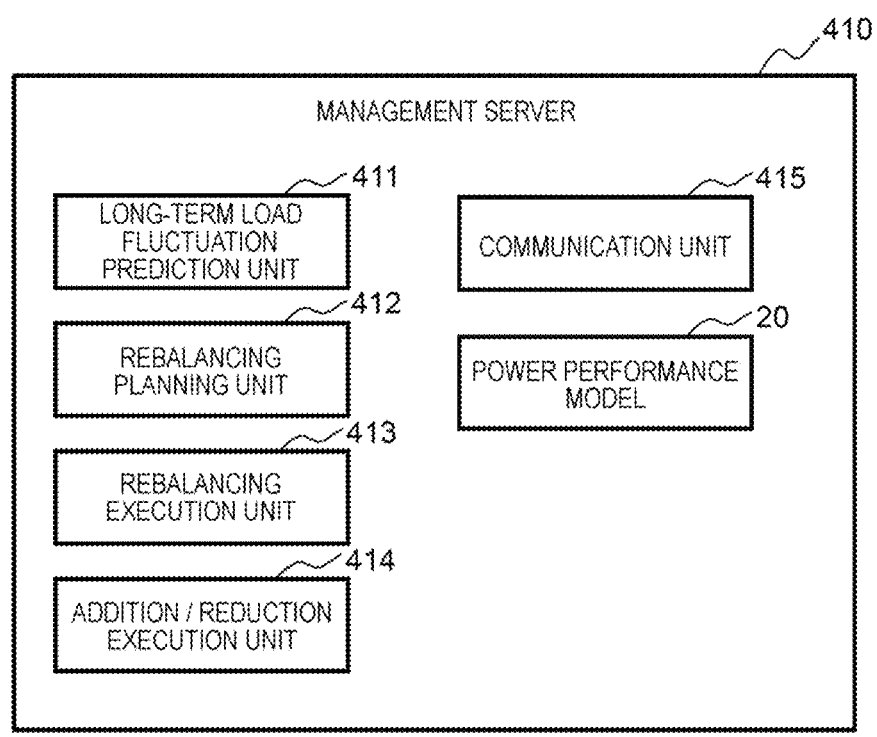
FIG. 3 is a diagram illustrating a configuration of a management server according to the first embodiment.

FIG. 3 is a diagram illustrating a configuration of the management server 410 according to the first embodiment.

The management server 410 is connected to the storage system 1S via the management network switch 330 and a management network (not illustrated). In FIG. 3, only the functional configuration of the management server 410 related to this embodiment is illustrated and described, and the illustration and description of other functional configurations are omitted.

The management server 410 includes a long-term load fluctuation prediction unit 411, a rebalancing planning unit 412, a rebalancing execution unit 413, an addition/reduction execution unit 414, a communication unit 415, and a power performance model 20. The management server 410 also has a display unit for displaying information to an operator and an input unit such as a keyboard for receiving information input by the operator. The power performance model 20 is stored in a predetermined storage area. In the power performance model 20, a controller reduction threshold value 3A (system loads L1 to L3) and a controller addition threshold value 3B (system loads L4 to L6), which will be described later, can be edited by the operator through the display unit and the input unit.

The communication unit 415 is a communication interface for allowing the management server 410 to communicate with the controller nodes 100, the drive nodes 200, the compute nodes 400, and the storage nodes 500 via the management network switch 330.

The long-term load fluctuation prediction unit 411 predicts the trend of the amount of fluctuation when viewing the fluctuations in the load (hereinafter referred to as "controller load") on the controller node 100 over a span of a certain period (for example, several weeks) of time. When the state in which the trend can be regarded as constant continues for a certain period of time, the long-term load fluctuation prediction unit 411 determines that the controller load has a long-term load fluctuation that represents a fluctuation in the load from a long-term viewpoint. In this manner, the long-term load fluctuation prediction unit 411 predicts whether the controller load viewed over a certain long-term span is in an increasing trend or a decreasing trend.

It is noted that, instead of the management server 410, the plurality of processors 110 of each controller node 100 may execute a rebalancing and addition/reduction process of FIG. 5 by distributed cooperative processes. That is, the rebalancing and addition/reduction process is executed by a processor 1001 of the management server 410 or the processor 110 of the controller node 100.

Configuration of Rebalancing Planning Unit 412

Figure 4A:
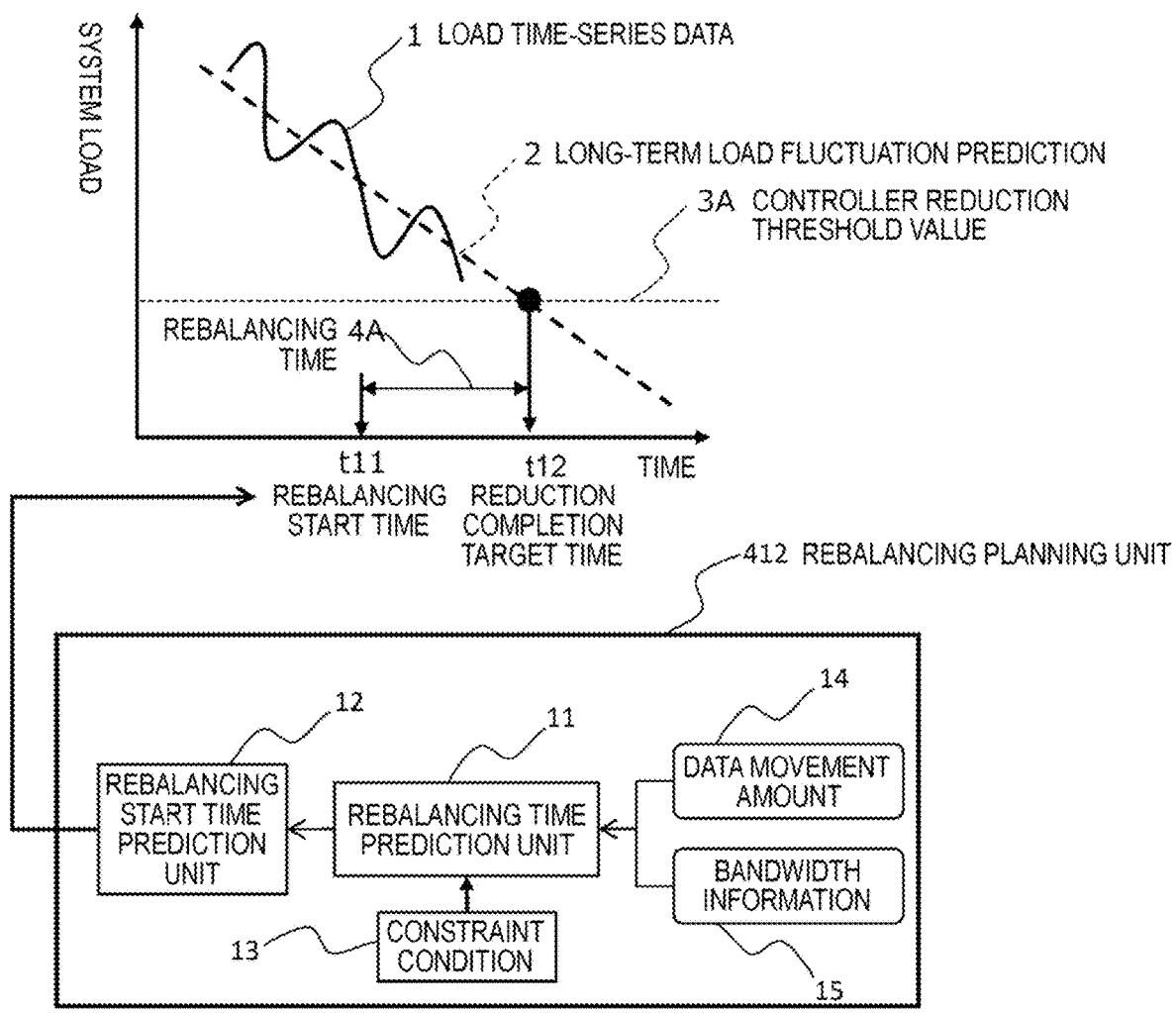
FIG. 4A is a diagram illustrating a configuration of a rebalancing planning unit according to the first embodiment and an overview of rebalancing control at the time of load decrease.

First, the rebalancing control at the time of load decrease will be described. FIG. 4A is a diagram illustrating a configuration of the rebalancing planning unit 412 according to the first embodiment and an overview of rebalancing control at the time of load decrease.

The rebalancing planning unit 412 has a rebalancing time prediction unit 11 and a rebalancing start time prediction unit 12. The rebalancing planning unit 412 also stores each data of a constraint condition 13, a data movement amount 14, and bandwidth information 15 in the storage area.

The controller node 100 constantly measures and accumulates the processing load (controller load) of the processor 110 of its own device as the load time-series data 1. The rebalancing planning unit 412 calculates the long-term load fluctuation prediction 2 by analyzing the load time-series data 1.

The controller load fluctuates according to the amount of work based on requests from a host device such as a host for the storage system 1S. The long-term load fluctuation prediction 2 is a prediction of a controller load fluctuation trend that is expected to continue for a certain period of time (for example, several weeks) in the future.

There is a limit to the amount of fluctuation of the controller load that can be covered by one controller node 100. Therefore, when the long-term load fluctuation prediction 2 exceeds the controller addition/reduction threshold value (controller reduction threshold value 3A or controller addition threshold value 3B), it is necessary to perform the addition/reduction of the controller to be operated. In order to release unnecessary resources without delay and maintain necessary and sufficient resource allocation, the goal is to complete the controller addition/reduction at the timing when the long-term load fluctuation prediction 2 exceeds the controller addition/reduction threshold value.

Figure 4B:
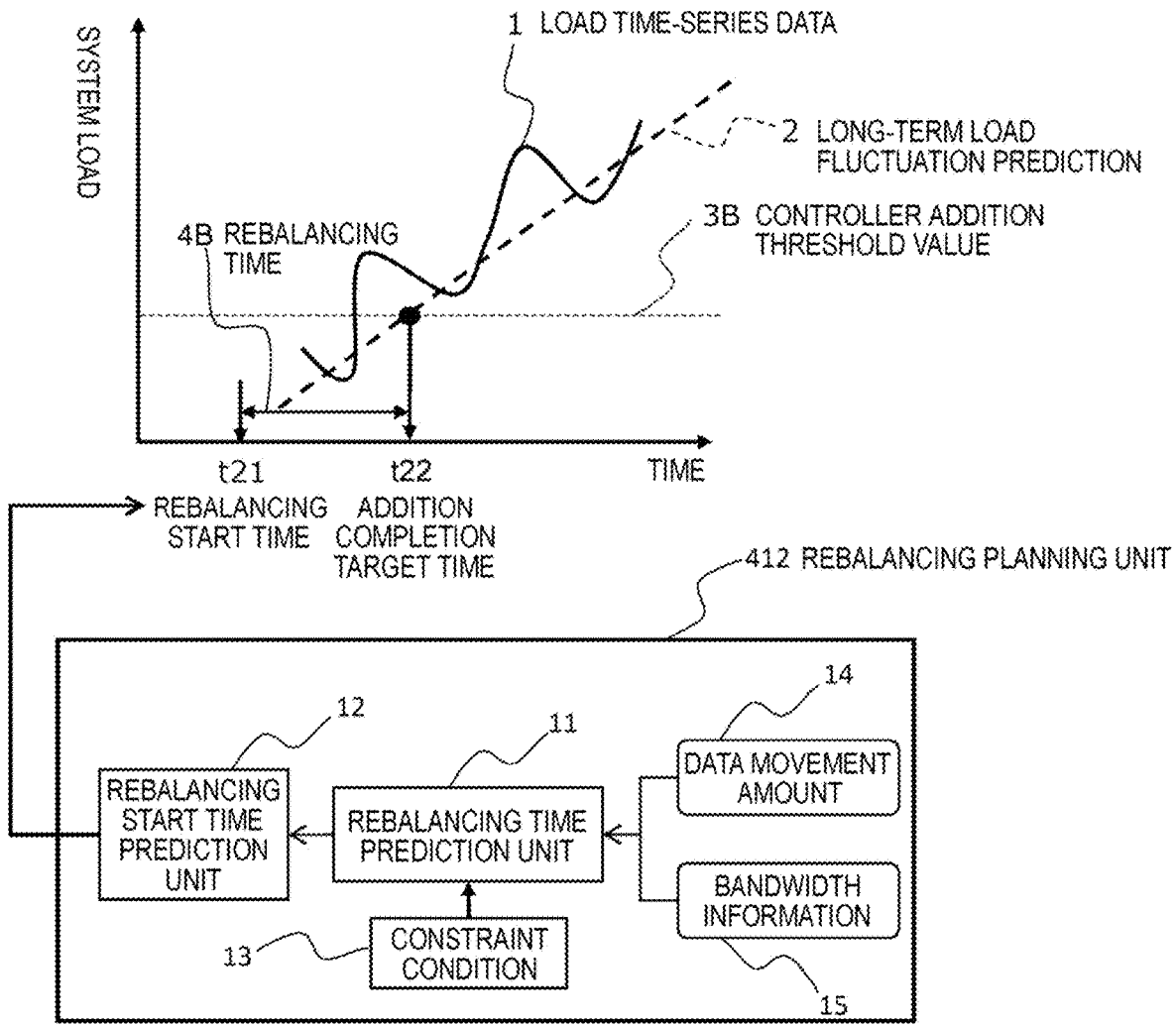
FIG. 4B is a diagram illustrating the configuration of a rebalancing planning unit according to the first embodiment and an overview of rebalancing control at the time of load increase.

When the load time-series data 1 decreases as illustrated in the graph of FIG. 4A, the controller addition/reduction threshold value becomes the controller reduction threshold value 3A, and when the load time-series data 1 increases as illustrated in the graph of FIG. 4B, the controller addition/reduction threshold value becomes the controller addition threshold value 3B. The controller reduction threshold value 3A and the controller addition threshold value 3B are generally different.

The rebalancing planning unit 412 determines whether the long-term load fluctuation prediction 2 exceeds the controller addition/reduction threshold value (controller reduction threshold value 3A or controller addition threshold value 3B). Then, the rebalancing planning unit 412 sets the timing when the long-term load fluctuation prediction 2 exceeds the controller reduction threshold value 3A as the target time for completing the reduction of the controller node 100 (a reduction completion target time t12). The reduction completion target time t12 can be calculated from the intersection of the long-term load fluctuation prediction 2 and the controller reduction threshold value 3A.

On the other hand, in order to reduce the controller node 100, it is necessary to move the data from the control of the controller node 100 to the control of another controller node 100. This is called rebalancing of the controller. In general, rebalancing includes moving actual data and moving metadata. The actual data is the entity data stored in the storage area of the storage system. The metadata is data used for managing the entity data. In this embodiment, since the drive node 200 is not added or reduced, only the metadata is moved, and the actual data is not moved.

The rebalancing time 4A required for rebalancing the controller node 100 depends on the constraint condition 13, the data movement amount 14 at the time of the rebalancing, and the bandwidth information 15 of the path used for this data movement. The constraint condition 13 is, for example, a time constraint condition such as time zones in which data can be moved, and a physical constraint condition such as the order of data movement. The rebalancing time 4A may also be influenced by information other than the constraint condition 13, the data movement amount 14, and the bandwidth information 15.

The rebalancing time prediction unit 11 predicts the rebalancing time 4A based on the constraint condition 13, the data movement amount 14, and the bandwidth information 15. The rebalancing start time prediction unit 12 sets a rebalancing start time t11 before the time calculated by subtracting the rebalancing time 4A from the reduction completion target time t12. In this manner, the rebalancing planning unit 412 creates a rebalancing plan including the rebalancing start time t11, the rebalancing time 4A, and the reduction completion target time t12.

Next, the rebalancing control at the time of load increase will be described. FIG. 4B is a diagram illustrating a configuration of the rebalancing planning unit 412 according to the first embodiment and an overview of rebalancing control at the time of load increase.

The timing at which the long-term load fluctuation prediction 2 exceeds the controller addition threshold value 3B is set as the target time (an addition completion target time t22) for completing the addition of the controller node 100. The addition completion target time t22 can be calculated from the intersection of the long-term load fluctuation prediction 2 and the controller addition threshold value 3B.

The rebalancing time 4B required for rebalancing the controller node 100 depends on the constraint condition 13, the data movement amount 14 at the time of the rebalancing, and the bandwidth information 15 used for this data movement. The rebalancing time 4B may also be influenced by information other than the constraint condition 13, the data movement amount 14, and the bandwidth information 15.

The rebalancing time prediction unit 11 predicts the rebalancing time 4B based on the constraint condition 13, the data movement amount 14, and the bandwidth information 15. The rebalancing start time prediction unit 12 sets a rebalancing start time t21 before the time calculated by subtracting the rebalancing time 4B from the addition completion target time t22.

The description will be given by referring back to FIG. 3. The rebalancing execution unit 413 transmits an instruction to the controller node 100 to execute the rebalancing according to the rebalancing plan created by the rebalancing planning unit 412. When the rebalancing is completed, the rebalancing execution unit 413 receives a rebalancing completion notification from the controller node 100.

When the rebalancing execution unit 413 receives the rebalancing completion notification, the addition/reduction execution unit 414 transmits an instruction to each controller node 100 so as to perform the addition/reduction of the controller node 100. When the addition/reduction of the controller node 100 is completed, the addition/reduction execution unit 414 receives the addition/reduction completion notification from the controller node 100.

Rebalancing and Addition/Reduction Process According to Embodiment

FIG. 5 is a flowchart illustrating a rebalancing and addition/reduction process according to the first embodiment. The rebalancing and addition/reduction process according to the embodiment is periodically executed by the management server 410.

First, in step S11, the long-term load fluctuation prediction unit 411 calculates the long-term load fluctuation prediction 2 based on the load time-series data 1. Next, in step S12, the long-term load fluctuation prediction unit 411 determines whether to perform the addition/reduction of the controller node 100. Specifically, the long-term load fluctuation prediction unit 411 determines whether the trend of the long-term load fluctuation prediction 2 of the controller is expected to exceed the controller addition/reduction threshold value within a certain period of time. When a trend curve of the long-term load fluctuation prediction 2 is expected to exceed the controller addition/reduction threshold value within a certain period of time (YES in step S12), the long-term load fluctuation prediction unit 411 determines that the addition/reduction is necessary and shifts the process to step S13. On the other hand, when the trend curve of the long-term load fluctuation prediction 2 is not expected to exceed the controller addition/reduction threshold value within a certain period of time (NO in step S12), the long-term load fluctuation prediction unit 411 determines that the addition/reduction is not necessary and ends the rebalancing and addition/reduction process.

In step S13, the rebalancing planning unit 412 creates a rebalancing plan based on the latest information of the long-term load fluctuation prediction 2 determined in step S13 that the trend exceeds curve the controller addition/reduction threshold value within a certain period of time and the power performance model 20. In the planning, the necessary controller addition/reduction threshold value is provided by the power performance model 20. Details of the power performance model 20 will be described later with reference to FIGS. 6A and 6B.

Next, in step S14, the rebalancing planning unit 412 determines whether to continue rebalancing. Since the rebalancing takes a certain amount of time or more, there is no change in the decreasing or increasing trend of the long-term load fluctuation prediction 2, and it needs to be periodically confirmed whether the rebalancing plan created in step S13 may be performed as planned. In addition, for example, it may be confirmed whether the cost (such as the power cost required for the data movement for the rebalancing) of the addition/reduction of the controller node 100 is worth the operating cost for a predetermined period of time after the addition/reduction of the controller node 100. For example, when the cost of the reduction of the controller node 100 is greater than the amount of reduction in the operation cost of the controller node 100 after the reduction, the cost is not worth the reduction of the controller node 100, so that the reduction of the controller node 100 is not to be performed. Further, when the controller load does not increase more than expected even when the controller node 100 is added, the cost is not worth, so that the addition of the controller node 100 is not to be performed. In this manner, based on the comparison result of the cost, it is determined whether to perform the addition or the reduction of the controller nodes 100.

The rebalancing planning unit 412 proceeds to step S15 when rebalancing is to be continued (YES in step S14), and ends this rebalancing and addition/reduction process when rebalancing is to be interrupted (NO in step S14).

In step S15, the rebalancing execution unit 413 transmits an instruction to the controller node 100 so as to move the actual data and/or the metadata as the rebalancing process.

Next, in step S16, the rebalancing execution unit 413 determines whether the rebalancing completion notification has been received for rebalancing completion from the controller node 100. Step S16 is executed after a predetermined time has elapsed after the execution of step S15.

When the rebalancing is completed (YES in step S16), the rebalancing execution unit 413 shifts the process to step S17, and when the rebalancing is not completed (NO in step S16), the rebalancing execution unit 413 shifts the process to step S13. In step S13 to which the process has been transferred from step S16, the rebalancing planning unit 412 corrects the rebalancing plan based on the latest information of the long-term load fluctuation prediction 2 and the power performance model 20 and executes steps S14 to S16 based on the corrected rebalancing plan. By correcting the rebalancing plan in a process flow from step S16 to step S13, a situation in which the rebalancing plan created in step S13 and the current state of the long-term load fluctuation prediction 2 deviate greatly can be avoided.

In step S17, the addition/reduction execution unit 414 transmits an instruction to the controller node 100 so as to execute the addition/reduction of the controller node 100. When the addition/reduction of the controller node 100 is completed, the addition/reduction execution unit 414 receives the addition/reduction completion notification from the controller node 100.

As described above, the controller addition/reduction can be performed at the required timing without delay by starting the rebalancing for controller required addition/reduction in accordance with the controller addition/reduction completion target time.

Power Performance Model 20 According to Embodiment

Figure 6A:
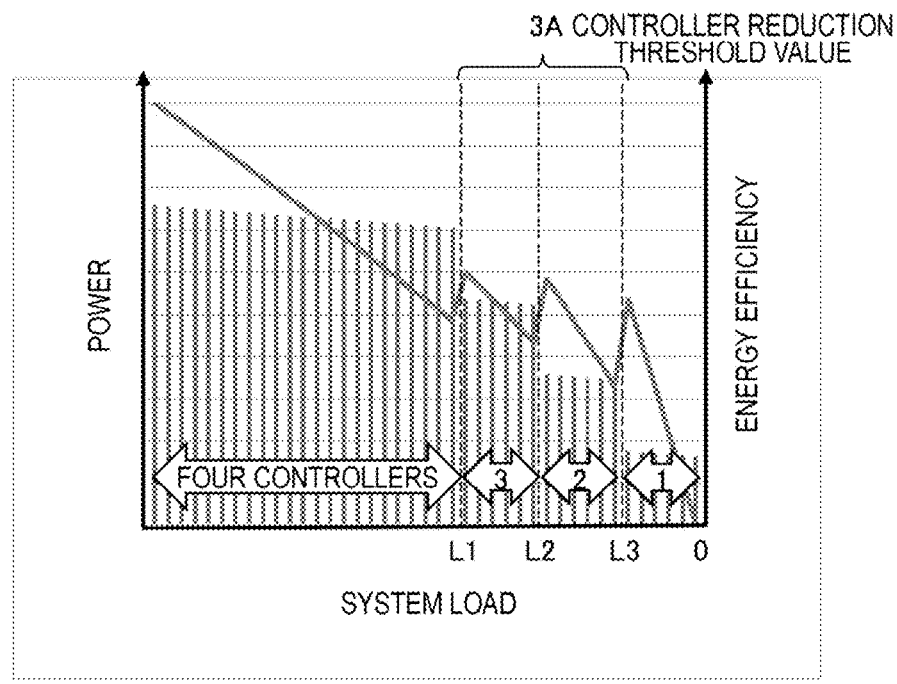
FIG. 6A is a diagram illustrating a power performance model (at the time of load decrease) according to the first embodiment.
Figure 6B:
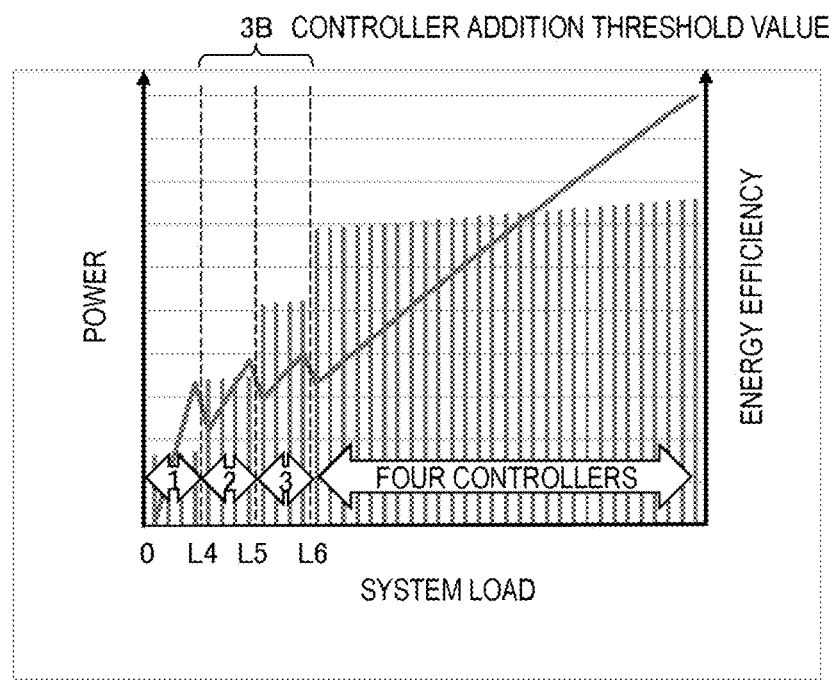
FIG. 6B is a diagram illustrating a power performance model (at the time of load increase) according to the first embodiment.

Next, the power performance model 20 according to the embodiment will be described. FIG. 6A is a diagram illustrating the power performance model 20 (at the time of load decrease) according to the first embodiment. FIG. 6A is a diagram illustrating the power performance model 20 (at the time of load increase) according to the first embodiment. In FIGS. 6A and 6B, the horizontal axis represents the system load (controller load) scale, and the vertical axis represents the power scale or the energy efficiency scale. In FIGS. 6A and 6B, bar graphs represent the power at each time of the load, and line graphs represent the energy efficiency at each time of the load.

In the examples of FIGS. 6A and 6B, the number of controller nodes 100 is variable from 1 to 4, and three threshold values are each given at the time of controller load decrease and at the time of controller load increase. The threshold value is determined according to the variable number of the controller nodes 100.

In the power performance model 20, the controller reduction threshold value 3A and the controller addition threshold value 3B are adjusted according to the controller load of the controller node 100. Accordingly, the function of optimizing the trade-off between the performance of the controller node 100 and the power efficiency according to the system requirements is provided.

As illustrated in FIG. 6A, in the power performance model 20 at the time of decrease in the controller load, the controller reduction threshold value 3A is set so that the number of controllers decreases at relatively wide intervals like the system loads L1, L2, and L3. The system power decreases as the number of controllers decreases. In this manner, the performance of the controller is decreased relatively slowly with respect to the decrease in the load of the controller.

With respect to the load decrease of the controller, the decrease of the performance of the controller is started at an earlier timing than at the time of increase of the load. This is because the higher the load of the controller, the better the energy efficiency, but the worse the response performance.

On the other hand, as illustrated in FIG. 6B, in the power performance model 20 at the time of increase in the controller load, the controller addition threshold value 3B is set so that the number of controllers increases at relatively narrow intervals like the system loads L4, L5, and L6 in comparison to the system loads L1, L2, and L3. The system power increases as the number of controllers increases. In this manner, the performance of the controller is more quickly increased with respect to the increase in the load of the controller in comparison to the time of decrease of the load.

By adjusting the controller reduction threshold value 3A and the controller addition threshold value 3B in this manner, the trade-off between power saving and performance can be adjusted. In other words, the required performance can be provided without delay in the load rising phase, and unnecessary resources can be released without delay in the load falling phase, so that the power saving can be implemented. The controller reduction threshold value 3A and the controller addition threshold value 3B may be adjusted according to a power composition ratio. When a ratio of renewable energy is high, the amount of $CO_2$ emissions is small, and thus, the controller reduction threshold value 3A and the controller addition threshold value 3B can be set low, so that the addition can be easy, the reduction can be difficult, and the performance can be provided with a margin. The controller addition/reduction threshold value of the power performance model 20 may be changed at the time of system design or at the time of operation according to work requirements of the host device.

Rebalancing According to the First Embodiment

Figure 7:
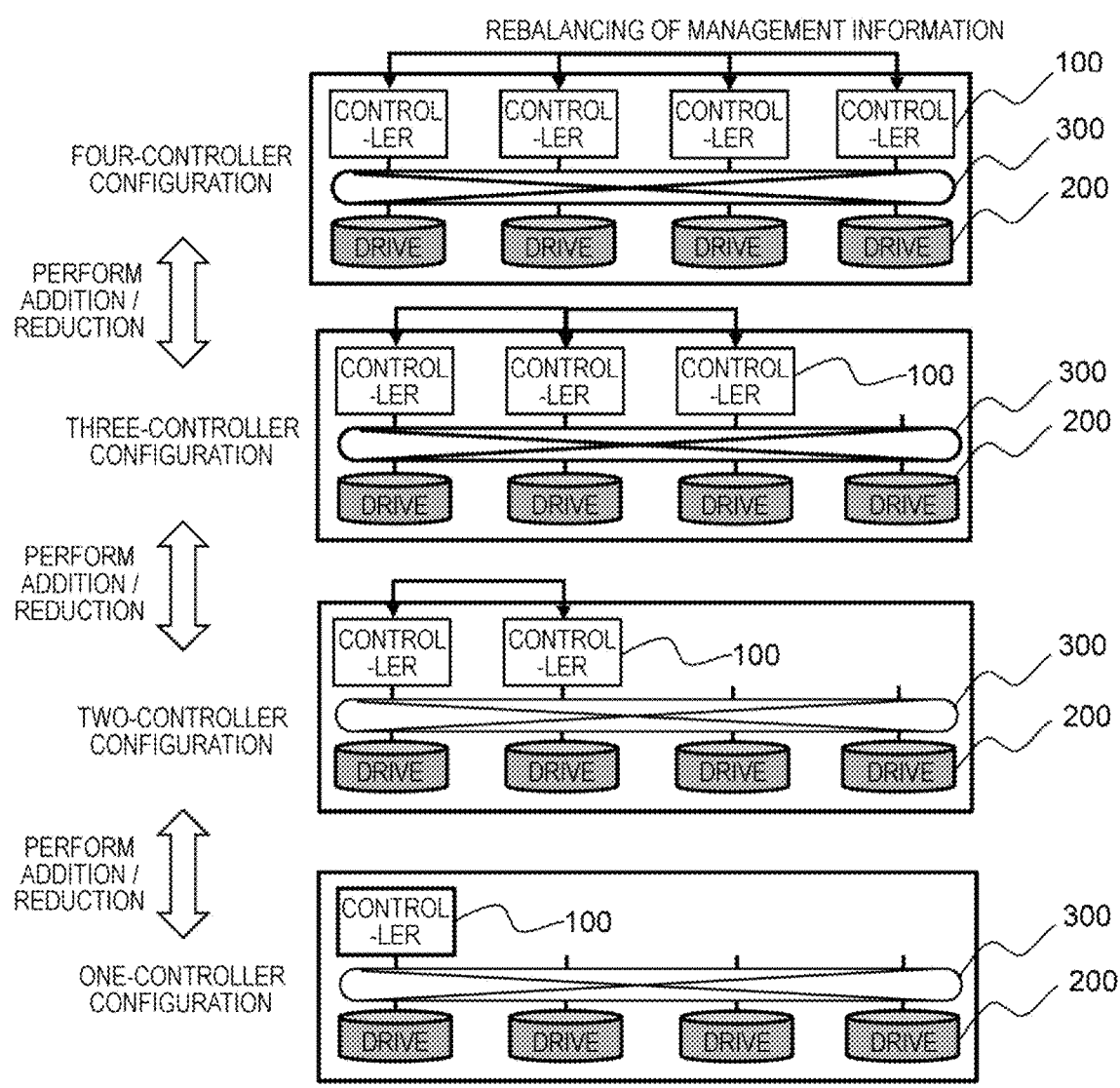
FIG. 7 is an explanatory diagram of a rebalancing operation according to the first embodiment.

FIG. 7 is an explanatory diagram of a rebalancing operation according to the first embodiment.

The input/output history processed by the controller node 100 is collected in the management server 410 as load time-series data 1. The management server 410 calculates the long-term load fluctuation prediction 2 from the collected load time-series data 1, and plans predictive rebalancing (step S13 (FIG. 5)). The result is transmitted to each controller node 100, and the predictive rebalancing is executed (step S15 (FIG. 5)).

In the system configuration of FIG. 7, the drive nodes 200, which are data storage areas, are separated from the controller nodes 100 and connected by the inter-controller-node network switch 300. For this reason, at the time of the rebalancing due to a change in the controller node 100 controlling the drive node 200, it is not necessary to move the actual data, but it is necessary to move the metadata, which is the management information of the actual data. After the necessary metadata is moved, the access path to the controller node 100 is switched, and the addition/reduction of the controller node is completed.

As described above, by completing the metadata movement in advance based on the long-term load fluctuation prediction 2, the addition/reduction of the controllers can be performed at the required timing without delay.

Effect of First Embodiment

In the above-described first embodiment, an overhead process necessary for the addition/reduction of the storage controllers such as the data movement of the metadata or the like is performed in advance based on the long-term load fluctuation prediction. Therefore, the addition/reduction of the controllers is performed at the required timing without delay, and thus, auto-scaling of the storage system can be performed. In addition, since the addition/reduction of the storage controllers can be performed in accordance with load fluctuations without delay, necessary and sufficient resources can be continuously provided, and unnecessary resources can be quickly released for power saving.

Second Embodiment

Figure 8:
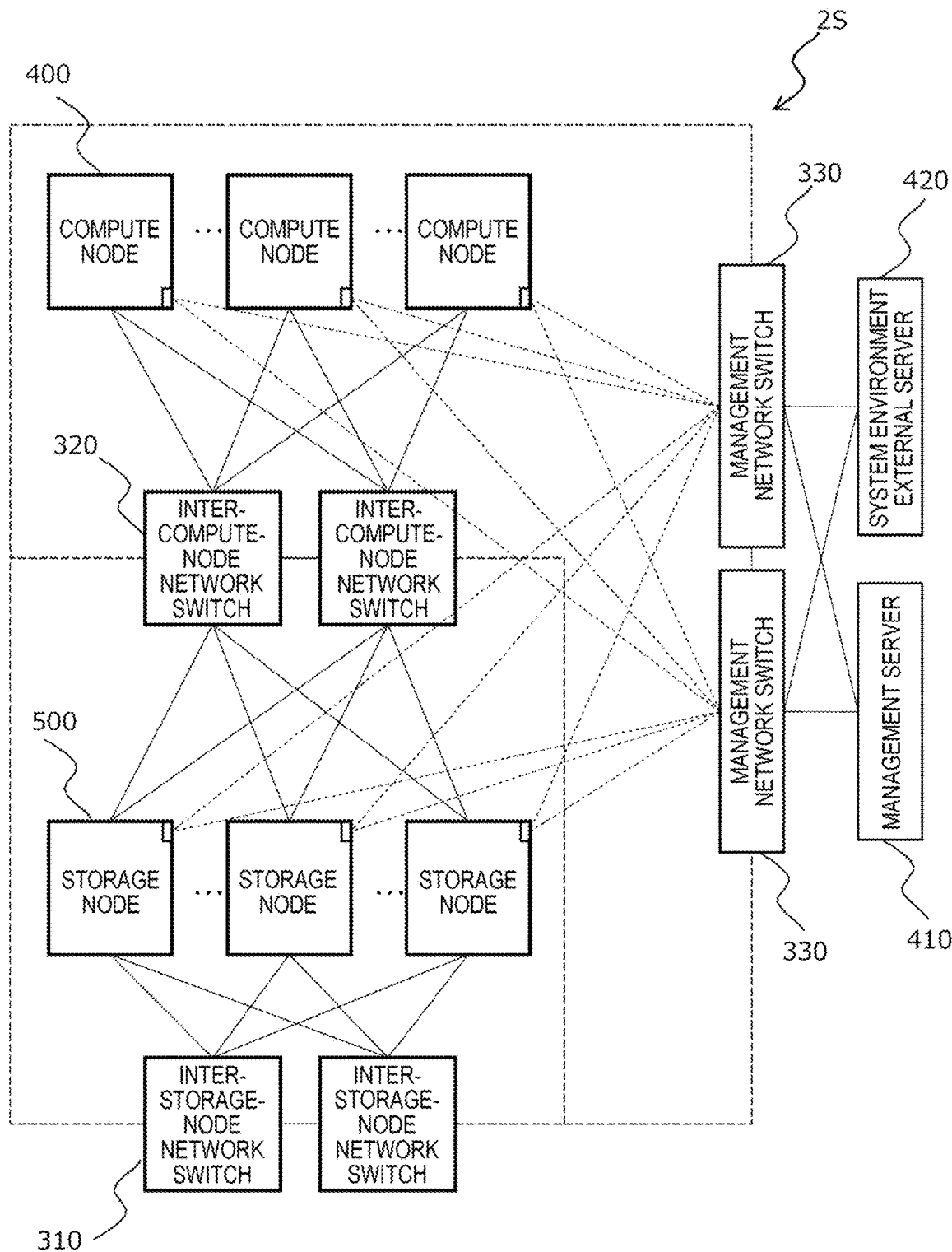
FIG. 8 is a diagram illustrating a configuration of a storage system according to a second embodiment.

FIG. 8 is a diagram illustrating a configuration of a storage system 2S according to a second embodiment. The storage system 2S includes a storage node in which a storage controller and a drive node are integrated. In the second embodiment, an addition/reduction process on the storage nodes in the storage system 2S is the same as the process of replacing the controller nodes with the storage nodes in the first embodiment, and only the difference will be described below.

In the storage system 2S, a plurality of compute nodes 400 and a plurality of storage nodes 500 are connected via an inter-storage-node network switch 310 and an inter-compute-node network switch 320. In addition, a management server 410 and a system environment external server 420 are connected via a management network switch 330 for system management. All nodes and paths are redundant to ensure system availability, but some nodes and paths will be omitted from the drawing.

Configuration of Storage Node 500 According to Second Embodiment

Figure 9:
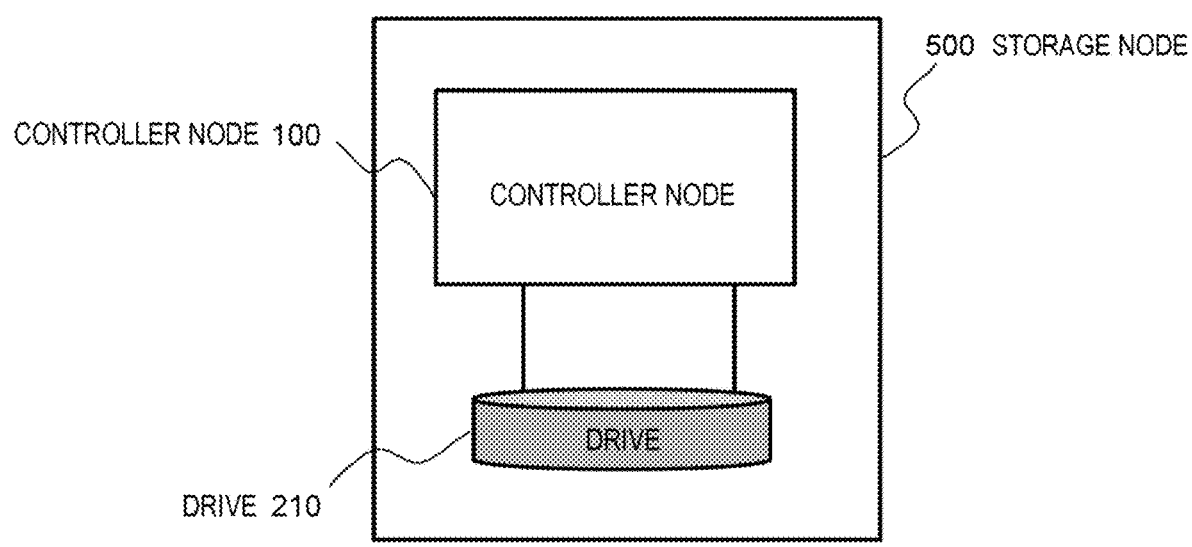
FIG. 9 is a diagram illustrating a configuration of a storage node according to the second embodiment.

FIG. 9 is a diagram illustrating a configuration of the storage node 500 according to the second embodiment. The storage node 500 is a device in which the controller node 100 and the drive node 210 are integrated.

Rebalancing According to Second Embodiment

Figure 10:
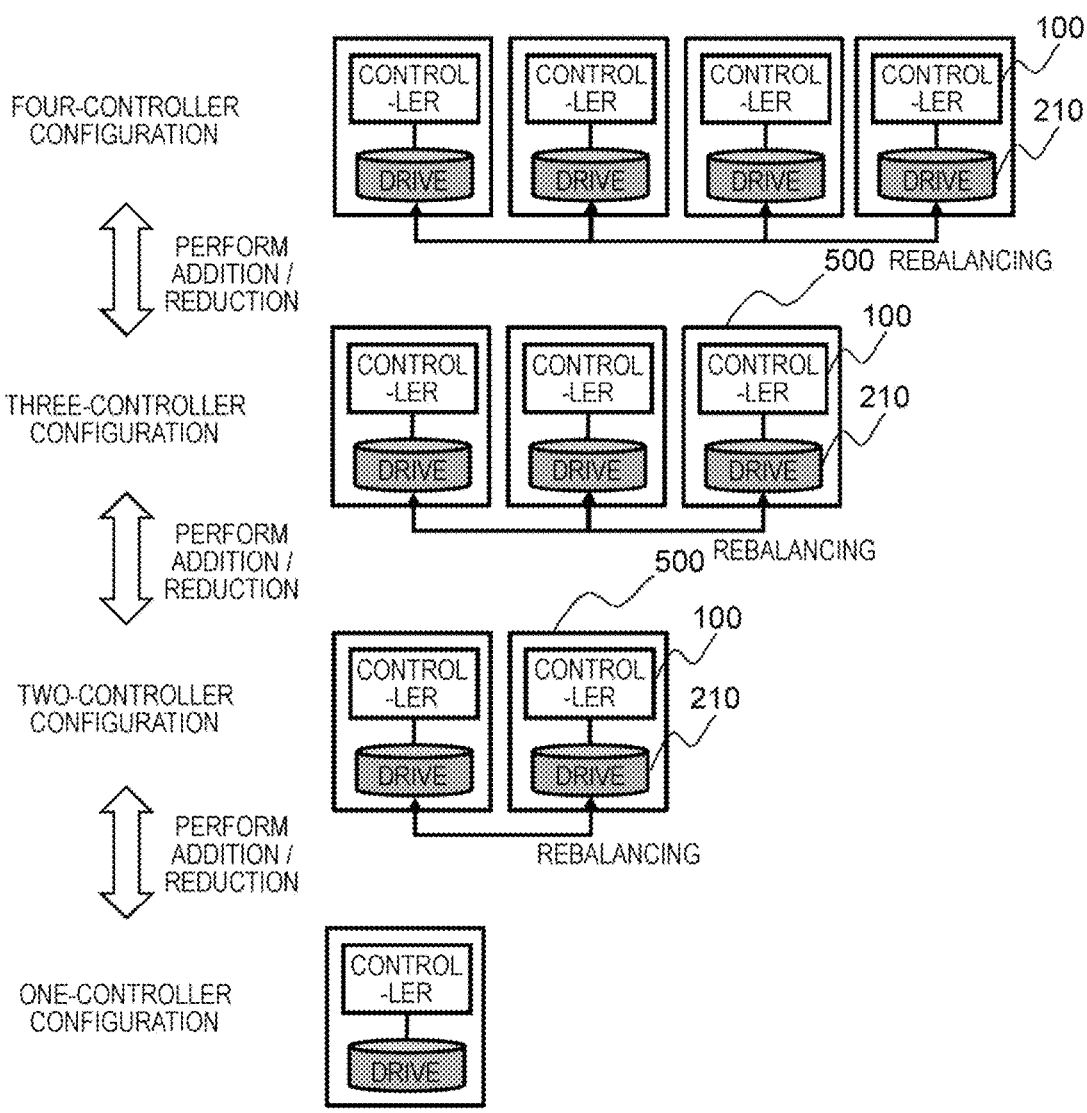
FIG. 10 is an explanatory diagram of a rebalancing operation according to the second embodiment.

FIG. 10 is an explanatory diagram of the rebalancing operation according to the second embodiment.

The input/output history processed by the controller node 100 in the storage node 500 is collected in the management server 410 as the load time-series data 1. The management server 410 calculates the long-term load fluctuation prediction 2 from the collected load time-series data 1 and plans the predictive rebalancing (step S13 (FIG. 5)). The result is transmitted to the controller node 100, and the predictive rebalancing is executed (step S15 (FIG. 5)).

In the system configuration of FIG. 10, the drive node 210 which is a data storage area and the controller node 100 are integrated in the storage node 500. For this reason, the actual data is required to be moved at the time of rebalancing in accordance with the addition/reduction of the controllers. After the required movement of the actual data (and associated metadata) is completed, the access path to the storage node 500 is switched, and the addition/reduction of the storage node 500 is completed.

That is, as illustrated in FIG. 10, transitions between the states of the 1-controller configuration, the 2-controller configuration, the 3-controller configuration, and the 4-controller configuration are performed in units of the storage node 500. This is because the drive node 210 and controller node 100 are integrated in the storage node 500. Therefore, at the time of addition of the storage node 500, new data is written to the added storage node 500. On the other hand, at the time of reduction of the storage node 500, the actual data and the metadata stored in the reduced storage node 500 are moved to another storage node 500 that is not reduced.

Effect of Second Embodiment

In the above-described second embodiment, the movement of the actual data and the metadata is completed in advance based on the long-term load fluctuation prediction 2 even in the storage node in which the controller node and the drive node are integrated. Therefore, the addition/reduction of the storage controllers can be performed at the required timing without delay, and power saving can be implemented.

Third Embodiment

Figure 11:
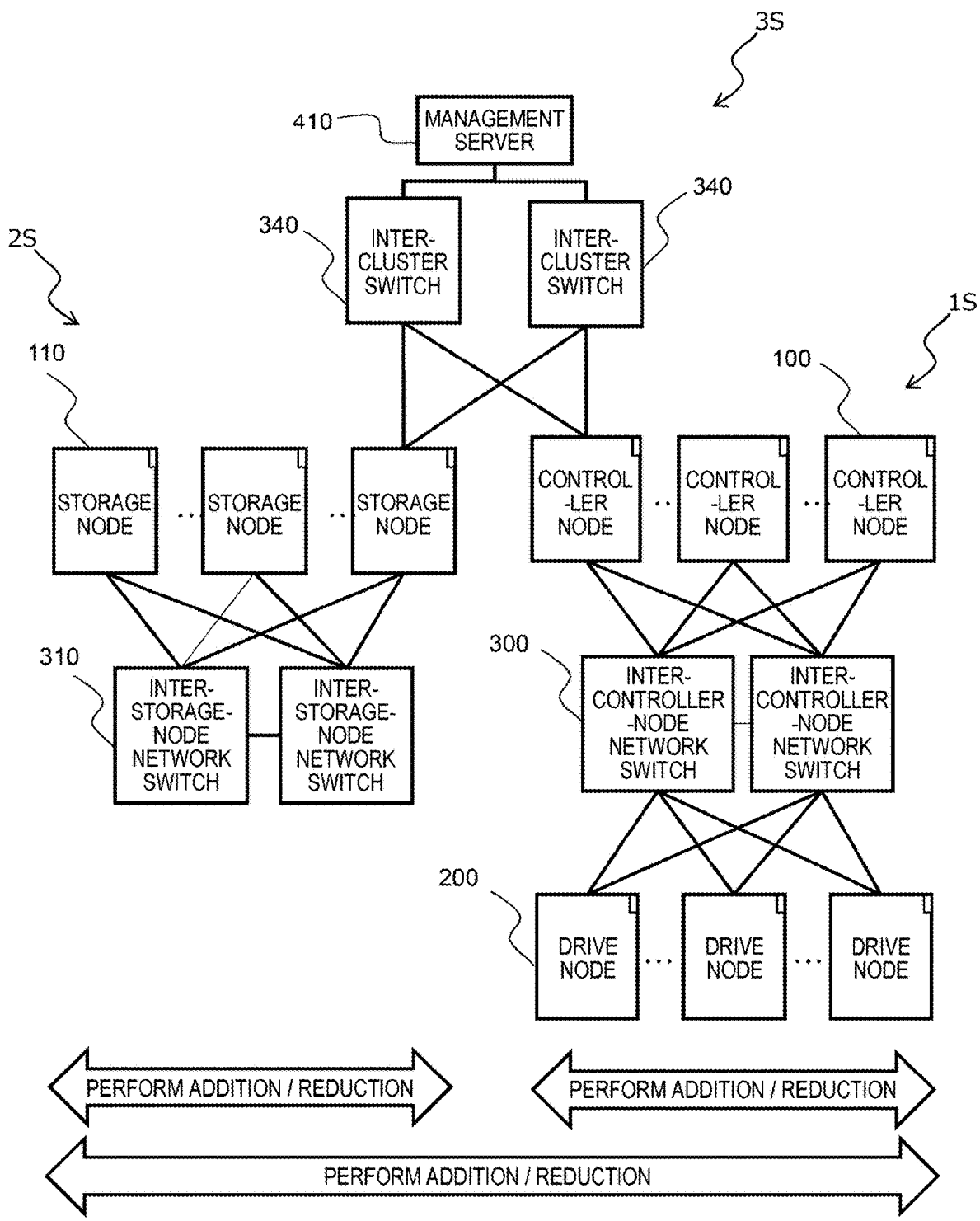
FIG. 11 is a diagram illustrating a configuration of a storage system including a plurality of storage systems according to a third embodiment.

FIG. 11 is a diagram illustrating a configuration of a storage system 3S including a plurality of storage systems 1S and/or 2S according to a third embodiment. Although FIG. 11 illustrates a configuration in which the storage system 3S includes one storage system 1S and one storage system 2S, these numbers can be changed. The storage system 3S may be configured to include only the plurality of storage systems 1S, may be configured to include only the plurality of storage systems 2S, or may be configured to include the plurality of storage systems 1S and 2S.

The storage system 3S is a hybrid storage system configured by connecting the plurality of storage clusters of the storage systems 1S and/or 2S via an inter-cluster switch 340. The storage system 3S is used for the purpose of optimizing the data arrangement by properly using the storage systems 1S and 2S according to data usage and a data life cycle.

For example, a use case can be considered in which, as the data life cycle progresses, data is moved from a storage cluster with high data storage costs to a storage cluster with low storage costs. At this time, the management server 410 performs predictive reduction according to the first or second embodiment within a movement-source storage cluster and performs predictive addition according to the first or second embodiment within a movement-destination storage cluster. Furthermore, the management server 410 performs predictive addition of the first or second embodiment between the movement-source storage cluster and the movement-destination storage cluster. Accordingly, the storage system 3S can also allocate and release necessary and sufficient resources without delay.

In each storage cluster, a work load associated with the operation of the project causes fluctuations in the load on the storage controller related to data. The storage controller is added or reduced based on the long-term load fluctuation prediction related to this load fluctuation. Whether the migration of data associated with the rebalancing is performed within its own storage cluster or directed to another storage cluster depends on the use case of the project and the work load.

Effect of Third Embodiment

In the above-described third embodiment, in the hybrid storage system, the addition/reduction of the storage controllers can be performed in units of the storage clusters, and the addition/reduction of the storage controllers can be performed across the plurality of storage clusters.

Fourth Embodiment

In the above-described first to third embodiments, the addition/reduction of the controller nodes 100 including the rebalancing are performed in accordance with only the timing of increase/decrease of the controller load (system load) without considering the increase in the rebalancing processing load of the controller nodes 100.

However, when the controller load further increases due to the rebalancing, there is a problem such as deterioration of the I/O performance for host systems such as the host.

Therefore, in the fourth embodiment, the rebalancing performing period of time of the first to third embodiments is limited, and the overall system load including the rebalancing is controlled so as not to exceed the threshold value.

Load Control According to Fourth Embodiment

Figure 12:
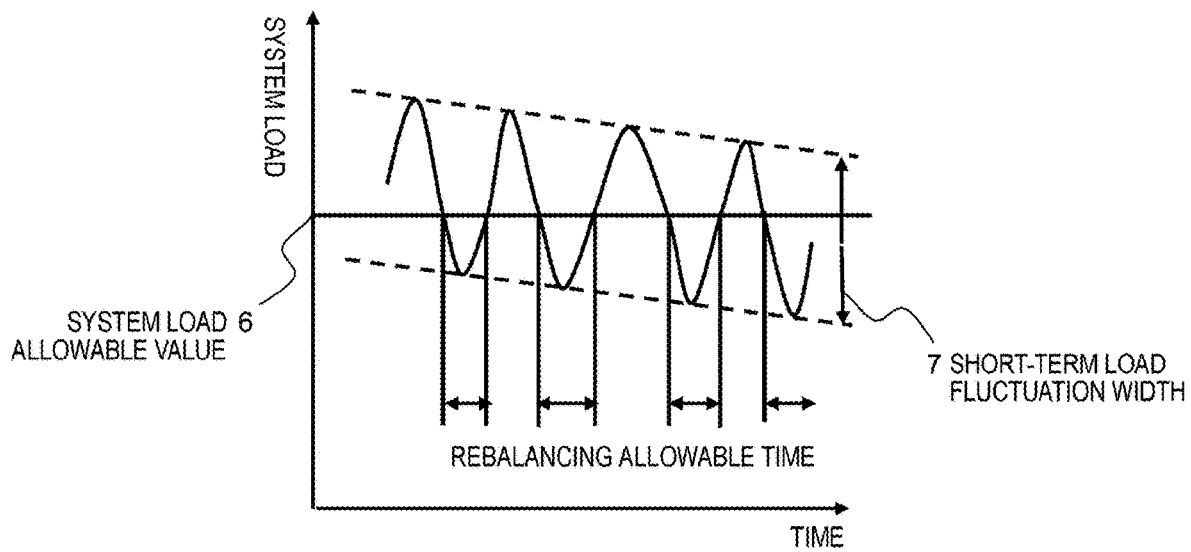
FIG. 12 is an explanatory diagram of load control for suppressing a system load including rebalancing below a system load allowable value according to a fourth embodiment.

FIG. 12 is an explanatory diagram of load control for suppressing a system load including rebalancing according to the fourth embodiment to the system load allowable value or less. FIG. 12 illustrates the short-term load fluctuation width 7 of the load time-series data 1. Herein, the "short term" denotes, for example, about 2 to 3 days.

In the fourth embodiment, the system operation is optimized by setting a specific constraint condition when performing rebalancing. The controller node 100 temporarily interrupts the rebalancing process when the load fluctuation of the controller node 100 exceeds the system load allowable value 6, in order to mitigate the influence of the performance deterioration of the normal I/O due to the rebalancing.

Effect of Fourth Embodiment

In the above-described fourth embodiment, when the load fluctuation of the controller node 100 described above exceeds the system load allowable value 6, the rebalancing process and the normal process can be balanced by controlling to temporarily interrupt the rebalancing process. In addition, although this control takes longer to complete the rebalancing, by calculating the rebalancing time in consideration of the increase in time, the rebalancing in accordance with the addition/reduction target time can be performed, and power saving can be achieved.

Fifth Embodiment

Figure 13:
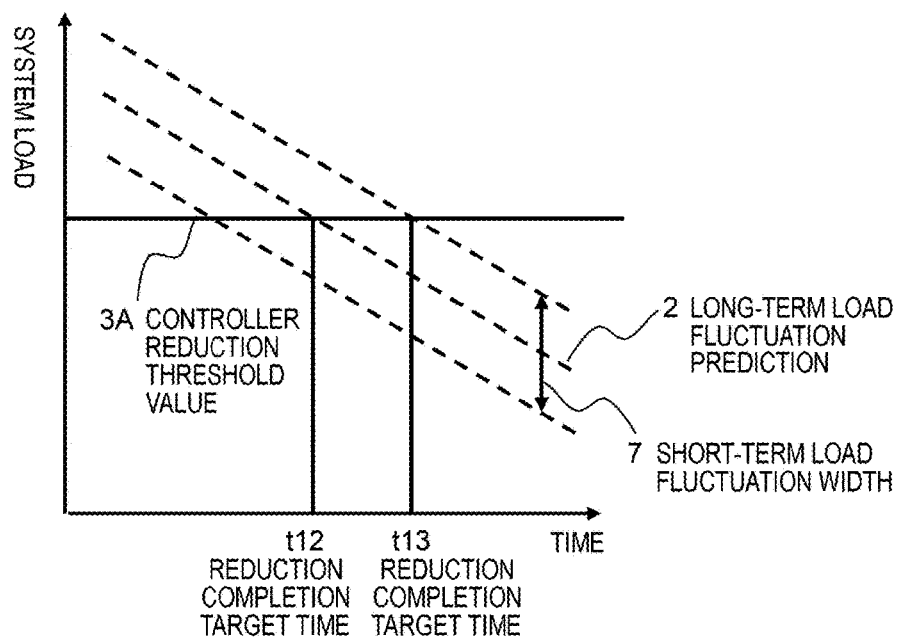
FIG. 13 is an explanatory diagram of load control excluding a short-term load fluctuation widths from long-term load fluctuation prediction according to a fifth embodiment.

In the above-described first to third embodiments, without considering the short-term load fluctuation of the long-term load fluctuation prediction 2 of the controller node 100, as illustrated in FIG. 13, the timing at which the long-term load fluctuation prediction 2 reaches, for example, the controller reduction threshold value 3A is set as the reduction completion target time t12. Herein, the "short term" is, for example, about 2 to 3 days. However, when the long-term load fluctuation prediction 2 fluctuates significantly in a short term, it is desirable to set the reduction target time at a timing that has a margin for this fluctuation. This problem also occurs at the time of calculating the addition completion target time t22.

In the fifth embodiment, the system operation is optimized by setting a specific constraint condition when performing rebalancing. That is, in the fifth embodiment, at the time of calculating the addition/reduction target time, in consideration of the short-term load fluctuation width 7 of the long-term load fluctuation prediction 2, control is performed so that the addition/reduction target time is calculated with the maximum value of the short-term load fluctuation width 7.

Load Control According to Fifth Embodiment

FIG. 13 is an explanatory diagram of the load control excluding the short-term load fluctuation width 7 from the long-term load fluctuation prediction 2 according to the fifth embodiment. FIG. 13 illustrates the case where the controller load decreases. Normally, the intersection of the long-term load fluctuation prediction 2 and the controller reduction threshold value 3A is set as the reduction completion target time t12.

However, when the short-term load fluctuation width 7 is large, the load time-series data 1 may fluctuate over the controller reduction threshold value 3A in a short term, which makes it difficult to plan stable rebalancing. Therefore, in order to improve the prediction accuracy of the reduction completion time, the short-term load fluctuation width 7 is calculated, and the intersection of the straight line representing the maximum value of the short-term load fluctuation width 7 and the controller reduction threshold value 3A is set as a reduction completion target time t13.

Effect of Fifth Embodiment

In the above-described fifth embodiment, by executing reduction with the reduction completion target time t13 as a target, the rebalancing and the reduction of the controller nodes 100 can be stably performed with the reduction completion target time t13 having a safety margin in consideration of the short-term load fluctuation width 7.

It is noted that, although FIG. 13 illustrates a case where the controller node 100 is reduced, the addition completion time at the time of adding the controller node 100 is similarly obtained.

Hardware of Computer 1000

Figure 14:
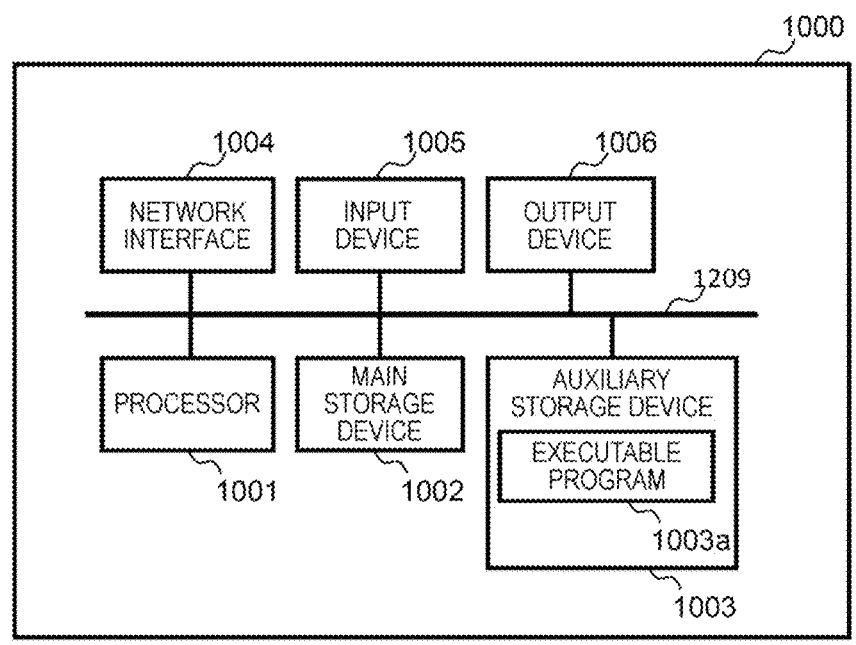
FIG. 14 is a hardware diagram of a computer.

FIG. 14 is a hardware diagram illustrating a configuration of a computer 1000. For example, the compute node 400, the management server 410, the system environment external server 420, and the storage node 500 are implemented by the computer 1000.

The computer 1000 includes a processor 1001 including a CPU, a main storage device 1002, an auxiliary storage device 1003, a network interface 1004, an input device 1005, and an output device 1006, which are interconnected via an internal communication line 1009 such as a bus.

The processor 1001 controls entire operations of the computer 1000. The main storage device 1002 is configured with, for example, a volatile semiconductor memory and used as a work memory for the processor 1001. The auxiliary storage device 1003 is an example of a non-temporary storage medium and is configured with a large-capacity non-volatile storage device such as a hard disk device, solid state drive (SSD), or flash memory and is used to store various programs and data for a long period of time.

An executable program 1100 stored in the auxiliary storage device 1003 is loaded into the main storage device 1002 when the computer 1000 is started or required, and the processor 1001 executes the executable program 1100 loaded into the main storage device 1002. Accordingly, a system that executes various processes and each functional unit (the long-term load fluctuation prediction unit 411, the rebalancing planning unit 412, the rebalancing execution unit 413, and the addition/reduction execution unit 414) are implemented.

The executable program 1100 may be recorded on a non-temporary recording medium and may be read from the non-temporary recording medium by a medium reading device to be loaded into the main storage device 1002. Alternatively, the executable program 1100 may be acquired from an external computer via a network and loaded into the main storage device 1002.

The network interface 1004 is an interface device for connecting the computer 1000 to each network in the system or communicating with other computers. The network interface 1004 is configured with a network interface card (NIC) such as a wired local area network (LAN) or a wireless LAN.

The input device 1005 is configured with a keyboard, a pointing device such as a mouse and used by the user to input various instructions and information to the computer 1000.

The output device 1006 is configured with a display device such as a liquid crystal display or an organic electro luminescence (EL) display and an audio output device such as a speaker and used to present necessary information to the user if necessary.

Although the embodiments according to the disclosure of the present application have been described in detail above, the disclosure of the present application is not limited to the above-described embodiments, and various modifications can be available without departing from the spirit thereof. For example, the above-described embodiments have been described in detail in order to describe the invention for the easy understanding, but the embodiments are not necessarily limited to those having all the described configurations. Moreover, with respect to a portion of the configuration of the above-described embodiments, addition, deletion, or replacement with another configuration is available.

In addition, a portion or all of the above-described configurations, functional units, processing units, or the like may be implemented in hardware, for example, by designing the configurations and the like with an integrated circuit. Further, each configuration, function, and the like described above may be implemented in software by the processor interpreting and executing a program for implementing each function. Information such as programs, tables, and files implementing each function can be stored in recording devices such as memories, hard disks, solid state drives (SSDs), and recording media such as IC cards, SD cards, and DVDs.

In addition, in each of the above diagrams, the control lines and the information lines that are considered necessary for description are illustrated, and not all the control lines and information lines for implementation are necessarily illustrated. For example, in practice, it may be considered that almost all structures are interconnected.

In addition, the functions and data arrangement form of the compute node 400, the management server 410, the system environment external server 420, and the storage node 500 described above are merely examples. The function and the arrangement form of the data can be changed to an optimum arrangement form from the viewpoint of hardware and software performance, processing efficiency, communication efficiency, and the like.

What is claimed is:

1. A storage system comprising:
   a plurality of drive nodes;
   a plurality of controller nodes controlling data from a host device to the plurality of drive nodes; and
   a processor,
   wherein the processor;
   calculates long-term load fluctuation prediction as prediction of load fluctuation over a certain period of time in future of the plurality of controller nodes based on time-series data of load of the plurality of controller nodes;

calculates an addition/reduction completion target time to complete addition or reduction of an operating controller node out of the plurality of controller nodes based on the long-term load fluctuation prediction and a load threshold value determined from a power performance model representing a relationship between the load and energy efficiency of the plurality of controller nodes;

calculates a rebalancing time for a rebalancing process based on a predicted amount of data movement for the rebalancing process for moving data between the plurality of drive nodes in accordance with the addition or the reduction, constraint conditions, and bandwidth information of a path for the data movement;

calculates a start time of the rebalancing process from the addition/reduction completion target time and the rebalancing time; and starts the rebalancing process at the start time.

2. The storage system according to claim 1, wherein, at the time of starting the rebalancing process, the processor compares a cost for moving the data in the rebalancing process with a cost related to operating the plurality of controller nodes for a predetermined period of time when the addition or the reduction is performed, and starts the rebalancing process based on a comparison result of the cost for moving the data in the rebalancing process with the cost related to operating the plurality of controller nodes.

3. The storage system according to claim 1, wherein the processor:

determines whether the rebalancing process is completed;

when it is determined that the rebalancing process is ended, performs the addition or the reduction of the operating controller node; and when it is not determined that the rebalancing process is ended, corrects the long-term load fluctuation prediction and performs the rebalancing process based on the corrected long-term load fluctuation prediction.

4. The storage system according to claim 1, wherein each drive node and each controller node is an independent nodes, and wherein the data move between the plurality of drive nodes in accordance with the addition or the reduction is metadata used for managing entity data.

5. The storage system according to claim 1, wherein a storage node is configured by integrating the drive node and the controller node, and wherein the data move between the plurality of drive nodes in accordance with the addition or the reduction are entity data and metadata used to manage the entity data.

6. The storage system according to claim 1, wherein, in the long-term load fluctuation prediction, the processor performs the rebalancing process only in a period of time when the load fluctuation in a predetermined short period of time has a predetermined allowable value or less.

7. The storage system according to claim 1, wherein the processor calculates the addition/reduction completion target time based on the long-term load fluctuation prediction and the load fluctuation in a predetermined short period of time in the long-term load fluctuation prediction.

8. The storage system according to claim 1, wherein the load threshold value is configured to be externally adjustable depending on which of power saving and performance of the plurality of controller nodes is prioritized.

9. A storage system comprising:

the storage system according to claim 1; and an inter-cluster switch connecting a plurality of storage systems including the storage system, wherein the rebalancing process and the addition or the reduction are performed within each storage system of the plurality of storage systems, and the rebalancing process and the addition or the reduction are performed between the plurality of storage systems.

10. A storage system control method executed by a storage system including a plurality of drive nodes, a plurality of controller nodes controlling data from a host device to the plurality of drive nodes, and a processor, the method comprising:

by the processor;

calculating long-term load fluctuation prediction as prediction of load fluctuation over a certain period of time in future of the plurality of controller nodes based on time-series data of load of the plurality of controller nodes;

calculating an addition/reduction completion target time to complete addition or reduction of an operating controller node out of the plurality of controller nodes based on the long-term load fluctuation prediction and a load threshold value determined from a power performance model representing a relationship between the load and energy efficiency of the plurality of controller nodes;

calculating a rebalancing time for a rebalancing process based on a predicted amount of data movement for the rebalancing process for moving data between the plurality of drive nodes in accordance with the addition or the reduction, constraint conditions, and bandwidth information of a path for the data movement;

calculating a start time of the rebalancing process from the addition/reduction completion target time and the rebalancing time; and starting the rebalancing process at the start time.

* * * * *